US010432113B2

(12) United States Patent
Ressel et al.

(10) Patent No.: US 10,432,113 B2
(45) Date of Patent: *Oct. 1, 2019

(54) METHOD FOR OPERATING A BUILDING CLOSURE

(71) Applicant: Overhead Door Corporation, Lewisville, TX (US)

(72) Inventors: Willi Ressel, Witten (DE); Christian Dietz, Wipperfürth (DE)

(73) Assignee: OVERHEAD DOOR CORPORATION, Lewisville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/740,016

(22) Filed: Jun. 15, 2015

(65) Prior Publication Data
US 2015/0280618 A1  Oct. 1, 2015

Related U.S. Application Data

(63) Continuation of application No. 13/304,830, filed on Nov. 28, 2011, now Pat. No. 9,057,217.

(30) Foreign Application Priority Data

Nov. 29, 2010  (DE) .................. 10 2010 052 623
Jul. 18, 2011   (DE) .................. 10 2011 107 867

(51) Int. Cl.
*E06B 3/00*    (2006.01)
*H02P 3/02*    (2006.01)
(Continued)

(52) U.S. Cl.
CPC .............. *H02P 3/025* (2013.01); *E05F 15/40* (2015.01); *E05F 15/668* (2015.01); *H02K 26/00* (2013.01);
(Continued)

(58) Field of Classification Search
CPC ......... E05F 15/40; E05F 15/668; H02P 3/025; H02K 26/00
See application file for complete search history.

(56) References Cited

U.S. PATENT DOCUMENTS 3,755,727 A * 8/1973 Schifalacqua ............ H02P 8/32
                                                          318/466
4,289,995 A * 9/1981 Sorber .................. E05F 15/611
                                                          318/262
(Continued)

FOREIGN PATENT DOCUMENTS

DE          9207371 U1    9/1992
DE          69109174 T2   8/1995
(Continued)

OTHER PUBLICATIONS

German Office Action issued in Appln. No. 102011107867.7 dated Apr. 18, 2012 and response filed Nov. 5, 2012.

*Primary Examiner* — Jerry E Redman
(74) *Attorney, Agent, or Firm* — Foley & Lardner LLP

(57) ABSTRACT

A method for operating a building closure having the shape of an overhead sectional door or of a garage door including at least one spring-loaded counterweight device and an electrical drive device is disclosed. A control unit simultaneously monitors the position of the building closure and a motor current for the drive device. When the building closure is in an open or a closed position, the motor current is reduced and maintained at a level to residually energize the drive device to reliably maintain the building closure in a desired position.

14 Claims, 2 Drawing Sheets

(51) Int. Cl.
 *E05F 15/668* (2015.01)
 *E05F 15/40* (2015.01)
 *H02K 26/00* (2006.01)
 *E05D 13/00* (2006.01)

(52) U.S. Cl.
 CPC ..... *E05D 13/1261* (2013.01); *E05Y 2201/416* (2013.01); *E05Y 2400/31* (2013.01); *E05Y 2400/32* (2013.01); *E05Y 2400/322* (2013.01); *E05Y 2400/354* (2013.01); *E05Y 2400/36* (2013.01); *E05Y 2400/456* (2013.01); *E05Y 2400/51* (2013.01); *E05Y 2800/00* (2013.01); *E05Y 2800/74* (2013.01); *E05Y 2900/106* (2013.01)

(56) References Cited

U.S. PATENT DOCUMENTS

| | | | | |
|---|---|---|---|---|
| 5,016,391 | A | | 5/1991 | Miller et al. |
| 5,230,179 | A | * | 7/1993 | Richmond ............ E05F 15/643 49/28 |
| 5,281,956 | A | * | 1/1994 | Bashark ............... D06F 37/304 340/12.32 |
| 5,444,440 | A | * | 8/1995 | Heydendahl ........... E05B 47/00 340/5.3 |
| 5,780,987 | A | * | 7/1998 | Fitzgibbon ........... E05F 15/668 318/16 |
| 5,929,580 | A | * | 7/1999 | Mullet ................ H02H 7/0851 160/292 |
| 6,172,475 | B1 | * | 1/2001 | Fitzgibbon ............. E05D 15/38 318/266 |
| 6,373,214 | B1 | * | 4/2002 | Hormann ................ E05F 15/70 310/68 E |
| RE37,784 | E | * | 7/2002 | Fitzgibbon ........... E05F 15/668 318/16 |
| 6,777,902 | B2 | * | 8/2004 | Fitzgibbon ................ H02P 1/44 318/266 |
| 7,017,302 | B2 | * | 3/2006 | Brookbank ........... E05F 15/668 160/191 |
| 7,187,150 | B2 | * | 3/2007 | Robb ................... G05B 19/351 318/266 |
| 7,207,142 | B2 | * | 4/2007 | Mullet .................... E05F 15/77 340/686.1 |
| 7,891,139 | B2 | * | 2/2011 | Nagakura ............... E05F 17/00 49/24 |
| 8,098,030 | B2 | * | 1/2012 | Theile .................. E05F 15/603 318/265 |
| 9,057,217 | B2 | * | 6/2015 | Ressel .................. E05F 15/668 |
| 2003/0178962 | A1 | | 9/2003 | Fitzgibbon et al. |
| 2004/0244390 | A1 | * | 12/2004 | Bashark ............... G01R 15/142 62/160 |
| 2009/0255188 | A1 | * | 10/2009 | Theile .................. E05F 15/603 49/506 |
| 2010/0107498 | A1 | * | 5/2010 | Ley .......................... E05F 15/70 49/199 |
| 2010/0319257 | A1 | | 12/2010 | Taheri et al. |
| 2012/0206023 | A1 | * | 8/2012 | Ressel ..................... H02P 3/025 310/68 B |

FOREIGN PATENT DOCUMENTS

| | | |
|---|---|---|
| DE | 102006011305 A1 | 9/2007 |
| DE | 102006011305 B4 | 12/2009 |
| DE | 202011001537 U1 | 4/2011 |

\* cited by examiner

METHOD FOR OPERATING A BUILDING CLOSURE

CROSS REFERENCE TO RELATED APPLICATION

This application is a continuation of U.S. patent application Ser. No. 13/304,830 filed Nov. 28, 2011, which will issue as U.S. Pat. No. 9,057,217 on Jun. 16, 2015, which is incorporated herein by reference in its entirety. This application also claims the benefit of German application No. DE 10 2011 107 867.7 filed Jul. 18, 2011 and German application No. DE 10 2010 052 623.1 filed Nov. 29, 2010.

BACKGROUND

The invention relates to a method for operating a building closure, preferably having the shape of an overhead sectional door or of a garage door including a spring-loaded counterweight device and an electrical drive device, which is charged by a control apparatus.

Such a door is revealed for example in the document DE 10 2006 1011 305 B4 as well as in U.S. Pat. No. 5,016,391.

Generally, building closure of the aforementioned species require a counterweight force which allows for moving the door leaf, either manually or by means of an electrical drive device, more easily between the open position and the closed position without any problems. Overhead door systems very often depend on one or more torsion springs to provide said counterweight force.

SUMMARY

As the forces, developed by the torsion spring, vary depending on the execution of the door and as a result of tolerances, it is difficult to precisely maintain the open position of a door. A maximum open position of the door is desired in order to have the entire passage opening available. However, in this open position, the torsion spring counteracts the strongest the force developed by the drive unit, which may result in failure to achieve a maximum opening width.

Another arising problem is that, when in the closed position, such a building closure should absolutely not be manually pushed open without authorization. Currently utilized motors usually have a gear, which includes a self-locking device. However, this self-locking device can be overcome when applying sufficient force. Separate push-open security devices and additional locks are often too expensive.

Therefore, it is the object of the invention, on the one hand to find a solution for the shortfalls of the state-of-the-art in the open position, respectively to likewise provide a solution when the door is in the closed position. In this case, expensive solutions, such as equipping the motor with an auxiliary winding and energizing the latter in the terminal positions should be foregone. Furthermore, mechanical interlocking units are not desired either, because they would increase the cost for such a building closure.

In a first preferred embodiment, a method for operating a building closure is proposed, preferably including at least one program, which, depending on the type and dimension of the door, is variable or automatically adaptable to operate a building closure in the shape of an overhead sectional door or of a garage door or the like including a spring-loaded counterweight device and an electrical drive device, which is charged by a control apparatus, in that the measured parameters of the building closure and of the installation situation thereof are stored in the control apparatus after a completed learning run, and then serve as the reference for the following operation of such a building closure. Based on the provided reference information, and in conjunction with a position detection unit, it is possible to always determine the exact position of the door leaf. In this case, the position detection unit may be directly connected to the electrical motor, respectively to a gear which is connected thereto, i.e. a direct or indirect movement of the building closure is detected. Such a position detection device is preferably configured as an absolute position detection device. At the same time, depending on the position of the building closure, at least one program in the control apparatus performs monitoring and changing the motor current along the entire travel path and in the terminal positions of the building closure.

When the building closure reaches, for example the open position, the gear motor needs to compensate for the largest force resulting from the counteracting torsion spring and the counterweight. So that the building closure does not accidentally leave the open position on account of the counter-acting forces, energizing the drive device is not suspended by at least one program or by program steps, instead residual energizing of the control apparatus is maintained. This amount of residual current generates a counteracting force, such that the building closure does not move into the non-desired opposite direction, and this in both the open position and the closed position. So to speak, in this position, the motor forces need to be brought to equilibrium with the prevailing counteracting forces, for example by means of the counterweight or the like. This represents a permanent process, which is likewise permanently monitored and maintained by the control apparatus. It is thereby possible to always and reliably maintain the building closure in the open position, also in spite of aging and modifications.

In another preferred embodiment, it is desired the above described building closure be kept in the closed position while withstanding violent external forces. This is achieved in that, after having closed the door, a low residual current is continued to be applied to the motor. The residual energizing is so important that manually opening the building closure by force is not possible, because the motor permanently pushes the building closure into the closed position. In this case again, on account of permanent monitoring and thus likewise permanent corrective controlling of the energizing by the control apparatus, for example in the event of opening the building closure by force, the control apparatus will proceed to modify, respectively to maintain the residual energizing of the drive device such that in each case, in its closed position, the building closure device is kept closed. Therefore the building closure is thus reliably prevented from being forcibly opened.

In another preferred embodiment of the above described building closure, both the open position and the closed position may be charged in the same way by residually energizing the drive device, such that the door is reliably maintained in both the open position and the closed position.

For the above described methods, the control apparatus is configured to include a microprocessor and appropriate memories for the different programs in that a programmed automatic adaptation to the necessary power requirement of the drive device in the terminal positions is automatically adapted or controlled, likewise if the parameters of the building closure are modified.

Therefore, each time the building closure stands still, the control apparatus maintains a permanent residual energizing of the drive device.

Now, if the motor receives a start instruction from a remote control or the like, the implemented programs deliver a soft-start-current with increasing intensity to the motor. This makes the motor start softly and therefore likewise the building closure starts softly to move. When reaching a maximum energizing of the motor, this soft-start-current changes to a traction current, such that the door moves at a greater speed than at the soft-start. Prior to reaching the open position, the program control issues a soft-stop instruction, which has the effect to reduce the motor current along the traveling path. In this case, the motor current is not abruptly reduced, instead it is slowly scaled down following a curve. This means, the motor travels slowly to a terminal position and thus into the open position or the closed position. Reaching the terminal position is communicated to the control apparatus by the position detection device and the required residual energizing of the drive motor is effected by a program step or individual programs. The residual energizing of the motor in the open position is maintained until the subsequent closing procedure of the building closure is performed. As the intensity of the residual energizing is very low, when compared to the traction current, heating of the drive device when permanently operated is excluded.

During a closing procedure, the above described different energizing of the drive motor along the traveling path is likewise performed in analogous manner, and likewise in the closed position, a residual current is applied to the drive motor.

In order to realize such an electrical drive device for operating a building closure of the aforementioned type according to the above described methods, in this case a pulse-width modulation may be used for example. By means of different pulse/spacing intervals of the current directed to the electrical motor of the drive device, such a pulse-width modulation determines the number of revolutions of the electrical motor. In this case, current is supplied to the electrical motor during a pulse, whereas the flow of the current to the electrical motor is inhibited during the spacing preset by the pulse-width modulator.

Another preferred mode to realize the above described methods for different energizing by means of a program, consists for example in utilizing a phase angle control for the drive motor.

DESCRIPTION OF THE DRAWINGS

In the following, the invention will be described in more detail based on the Figures, reference being made to the embodiment examples; in which.

DETAILED DESCRIPTION

Figure 1:
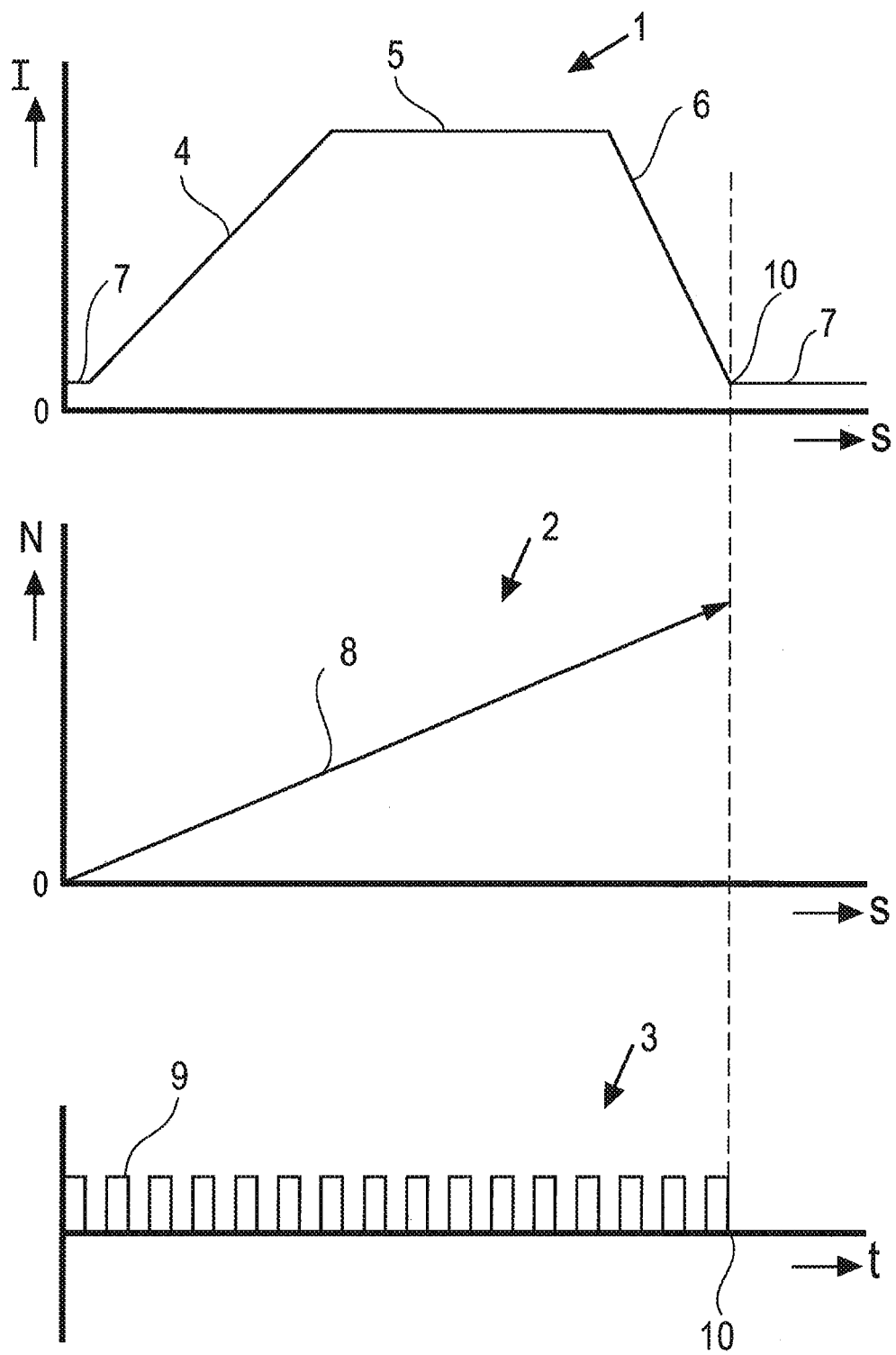
FIG. 1: shows characteristic lines representing on the one hand the motor current along the path, respectively over the time; in the middle the spring force of the torsion spring, and on the bottom the position measuring.

In FIG. 1, three diagrams are disposed one above the other, in which the X-axis respectively represents the path or the time. In the first upper diagram, the motor current is indicated at I on the Y-axis. The diagram below represents the counteracting force N of the torsion spring or the like, and the one below represents the individual pulses of the position detection device. The motor current at the non-illustrated motor is always set to an amount of a residual current 7, i.e. the motor current will never drop to zero. This means, the motor is permanently energized by a very low residual current 7, even at times when the building closure stands still, which can be seen in the diagram of the motor current characteristic line 1. When issuing a start instruction, for example for opening a connected building closure, a soft-start-current instruction 13 is issued, which follows the curve of the soft-start-current 4 with a current progressively increasing along the opening path. When reaching the maximum current, this soft-start-current curve 4 changes to a traction current curve 5. Prior to reaching the open position, which is determined by the position detection device and correspondingly processed in the control apparatus by the appropriate programs, the motor current is reduced, which translates to a soft-stop-current curve 6, as represented in the motor current characteristic line 1. When reaching the terminal position 10, the drive motor receives the information, that, due to lacking information from the position detection device 3, the terminal position is reached. The lacking pulses 9 result in that the motor current is set again to the residual energizing 7. This residual energizing 7 is not set to 0, but to a required low amount adapted to the system. At the same time, the spring force characteristic line 2 with a spring force curve 8 reveals that, when reaching the terminal position 10, the maximum spring force (counteracting force) is prevailing in the open position of the building closure. During a subsequent closing procedure of the building closure, the entire energizing of the motor is realized in a reversed manner. As the position detection device is directly connected to the motor or to the gear or drive means of the door moving parts, it is possible to exactly detect the motor motion, respectively the motor revolutions, because it is directly connected to the building closure.

Should the building closure be manipulated in the closed position, an opening force is produced, which acts against the residual current 7. This manipulation to attempt unauthorized opening of the building closure inevitably results in a rotational movement of the motor and thus to a detection at the position measuring device. This entails at the same time an increase of the motor current, namely in the direction of the closed position, because the utilized programs have not given any instruction to have the motor start moving in the open direction.

Figure 2:
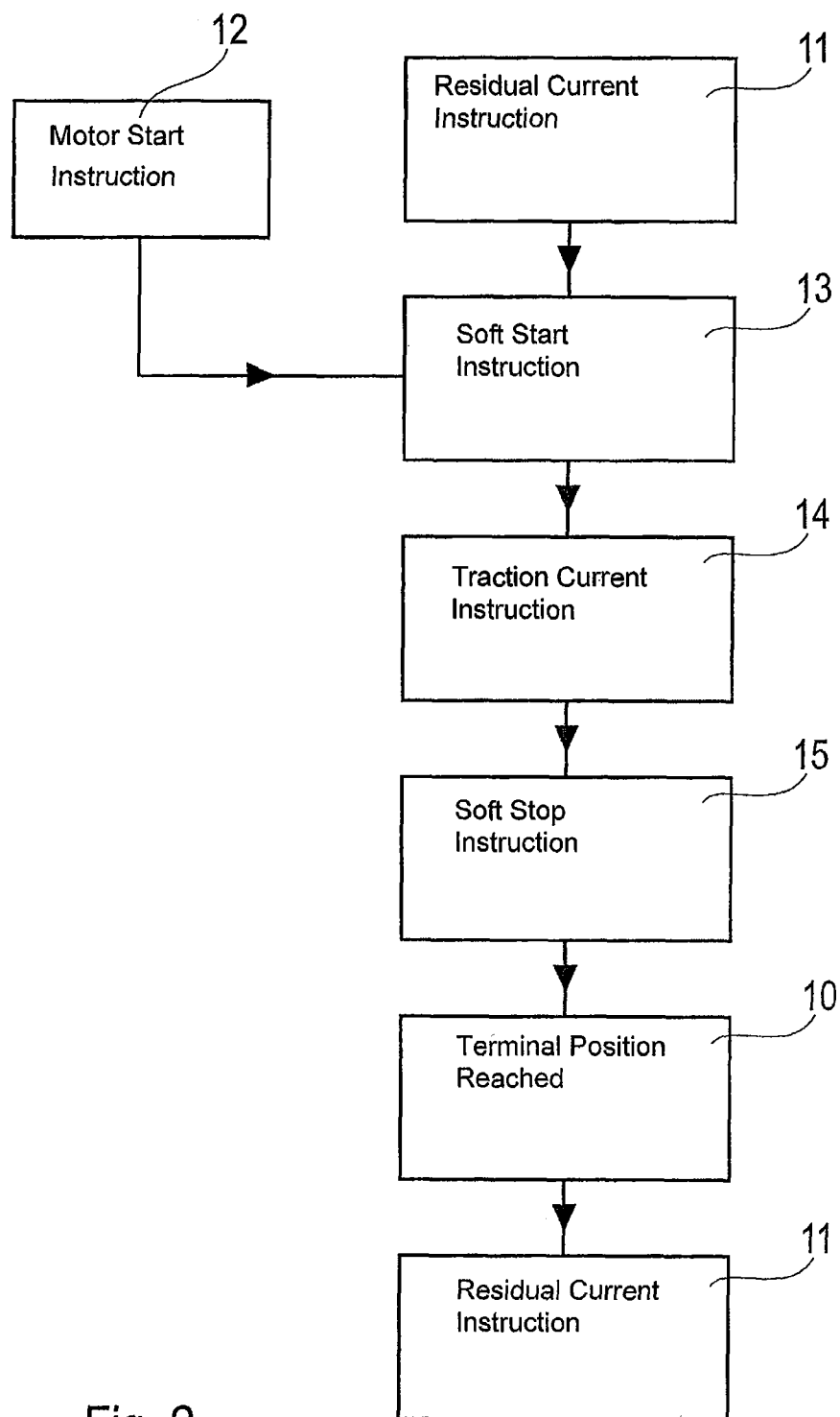
FIG. 2: shows a block diagram on energizing the motor by means of a program.

FIG. 2 illustrates again the programmed sequence of energizing the motor. The motor is permanently charged by the residual current 7, which is effected by a residual current instruction 11. When a motor start instruction 12 is triggered by a remote control or a manual switch, the soft-start instruction 13 is issued by a program, which results in a steady increase of the motor current up to a level of the maximum motor current set by the traction current instruction 14. Prior to reaching the desired terminal position, a soft-stop instruction 15 is issued on account of the predetermined current reduction, which effects a reduction of the motor current until the terminal position is reached. Once the terminal position 10 is reached, in which no information is issued by the position measuring device, the residual current instruction 11 is automatically issued and results in performing a correspondingly preset and changeable residual energizing of the drive motor.

No mechanical limit switches are provided in such a system.

What is claimed is:

1. A method for controlling a building closure between an open position and a closed position, the method comprising:
applying a residual current to a motor operably engaged with the building closure at a first static position;
receiving instructions including a current characteristic line defining a terminal position and a relationship between a current, including the residual current, and a position of the building closure between and including the open position and the closed position, wherein at least a portion of the current characteristic line depicts a positive progressive relationship and another portion of the current characteristic line depicts a negative progressive relationship between the current and the position of the building closure;
applying the current corresponding to the current characteristic line to the motor; and
upon reaching the terminal position, applying the residual current to the motor at the terminal position for holding the building closure still.

2. The method of claim 1, further comprising monitoring the current applied to the motor and the position of the building closure.

3. The method of claim 2, further comprising modifying the residual current to hold the building closure at the terminal position under different loading conditions.

4. The method of claim 3, wherein modifying the residual current is performed using a pulse-width modulation control or a phase angle control.

5. The method of claim 2, wherein the current characteristic line includes a soft-start current curve in which the current gradually increases, a traction current curve, and a soft-stop current curve in which the current gradually decreases.

6. The method of claim 5, wherein the current characteristic line is configurable for use with different types of doors.

7. The method of claim 1, wherein the terminal position is between the open position and the closed position.

8. The method of claim 1, wherein applying the current corresponding to the current characteristic line to the motor comprises applying a residual current instruction, a motor start instruction, a soft start instruction for gradually starting movement of the door, a traction current instruction, and a soft stop instruction for gradually stopping movement of the door.

9. A method for operating a building closure between an open position and a closed position, the method comprising:
supplying a residual current to a motor for generating a corresponding torque;
holding the building closure at a static position using the corresponding torque generated by the motor;
supplying instructions of a current characteristic line defining a terminal position and a relationship between a current, including the residual current, and a position of the building closure either between the open position and the closed position or including the open position or the closed position, wherein at least a portion of the current characteristic line depicts a positive progressive relationship and another potion of the current characteristic line depicts a negative progressive relationship between the current and the position of the building closure;
actuating the building closure according to the instructions; and
upon reaching the terminal position, generating the corresponding torque with the residual current for maintaining the building closure at the terminal position.

10. The method of claim 9, further comprising updating the current characteristic line in the instructions by monitoring the current and the position of the building closure for respectively actuating and holding the building closure to and at the terminal position.

11. The method of claim 10, wherein the instructions are configurable for different loading conditions based on a motor power and reaction forces from actuating the building closure.

12. The method of claim 9, wherein the current characteristic line further comprises a soft-start current curve in which the current gradually increases, a traction current curve, and a soft-stop current curve in which the current gradually decreases.

13. The method of claim 9, wherein actuating the building closure according to the instructions comprises the steps of providing a residual current instruction, a motor start instruction, a soft start instruction instruction for gradually starting movement of the door, a traction current instruction, and a soft stop instruction for gradually stopping movement of the door.

14. A method for controlling a building closure between and including an open position and a closed position, the method comprising:
applying a residual current to a motor operably engaged with the building closure at a static position;
receiving instructions, the instructions including a current characteristic line defining a start position, a terminal position and a relationship between a current, including the residual current, and a position of the building closure between and including the open position and the closed position, wherein at least a portion of the current characteristic line depicts a start current with increasing intensity to a maximum energizing of the motor such that the building closure begins to start moving gradually, a traction current defined by the maximum energizing of the motor such that the building closure moves at a greater speed than the speed resulting from the start current, and another portion of the current characteristic line depicts a stop current with decreasing intensity from the maximum energizing of the motor to slow down the speed of the building closure;
applying the current corresponding to the current characteristic line to the motor; and
upon reaching the terminal position, applying the residual current to the motor at the terminal position for maintaining the building closure in a static position.

* * * * *